United States Patent [19]

Boxer

[11] 4,196,377
[45] Apr. 1, 1980

[54] CONTROL CIRCUITS FOR ELECTRIC TRACTION MOTORS FOR VEHICLES

[75] Inventor: Trevor C. Boxer, Birmingham, England

[73] Assignee: Lucas Industries Limited, Birmingham, England

[21] Appl. No.: 847,282

[22] Filed: Oct. 31, 1977

[30] Foreign Application Priority Data

Nov. 2, 1976 [GB] United Kingdom ............... 45459/76

[51] Int. Cl.² ........................... H02P 3/14; H02P 5/06
[52] U.S. Cl. .................................... 318/269; 318/338; 318/376; 318/405; 318/423; 318/493
[58] Field of Search ............... 318/338, 350, 356, 405, 318/406, 423, 493, 139, 376, 381, 273, 269

[56] References Cited

U.S. PATENT DOCUMENTS

| | | | |
|---|---|---|---|
| 3,378,746 | 4/1968 | Weiser | 318/356 |
| 3,569,809 | 3/1971 | Comer | 318/338 |
| 3,841,238 | 10/1974 | Thompson et al. | 318/345 C |
| 3,866,098 | 2/1975 | Weiser | 318/251 |
| 3,989,990 | 11/1976 | Thompson | 318/139 |
| 4,037,144 | 7/1977 | Ohmae et al. | 318/338 |

Primary Examiner—David Smith, Jr.
Attorney, Agent, or Firm—Ladas, Parry, Von Gehr, Goldsmith & Deschamps

[57] ABSTRACT

An electric vehicle traction motor control circuit includes separate armature and field current controls. The armature control includes a difference amplifier connected to compare a current demand signal with an actual current signal from a transducer and a switching circuit controlled by this difference amplifier. The field control includes a second difference amplifier which operates to weaken the field current in either of two eventualities. In motoring the second difference amplifier receives its input via a start up circuit which connects the output of the first difference amplifier to the input of the second difference amplifier when the switching means has been in a first state for more than a predetermined time. In this case the field is weakened in accordance with the short fall of the output of the first difference amplifier below a first reference level. In braking the second difference amplifier receives its input via a further difference amplifier and a diode gate to weaken the field current in accordance with the excess of armature current over a second reference level.

5 Claims, 11 Drawing Figures

FIG. 3. SPEED TRANSDUCER INTERFACE

ARMATURE DEMAND
SPEED SHAPING

MTR/BK
COMPARATOR

FIG. 6. ARMATURE CURRENT D.A. & THYRISTOR DRIVE CCTS.

ARMATURE CHOPPER

FIG. 8. FIELD CURRENT CONTROL CCT.

FIG. 9.
FIELD CURRENT CHOPPER CCT

CONTROL CIRCUITS FOR ELECTRIC TRACTION MOTORS FOR VEHICLES

This invention relates to control circuits for traction motors for vehicles and is particularly concerned with control circuits of the general kind in which separate current control circuits are provided for the motor armature and field windings.

It is already known to control an electric traction motor utilising a free-running chopper type circuit which switches the armature current control device off when the actual armature current exceeds the armature current demanded by a given amount and switches on when it is less than the demand by a similar amount. It has also been proposed to employ a field current control circuit which reduces the field current during normal running when the back e.m.f. induced in the armature prevents the armature current reaching a level sufficiently in excess of the demanded current to effect switching off of the armature current.

It has now been found that when regenerative braking is employed in a system as generally referred to above, very high armature currents can occur when braking is instituted because of the substantial back e.m.f. which exists at that time.

A control circuit in accordance with the invention comprises an armature current control for switching an armature current control element on and off respectively when it exceeds and is less than an armature current demand by a predetermined amount, a field current control mode selection means for connecting the armature and field windings to provide motoring or regenerative braking, means operable during motoring to weaken the field current whenever the armature current fails to exceed the armature current demand by said predetermined amount and means operating during regenerative braking for weakening the field current whenever the armature current exceeds a predetermined level.

In the accompanying drawings:

FIGS. 3 to 9 show portions of FIG. 1 in more detail and

Figure 1:
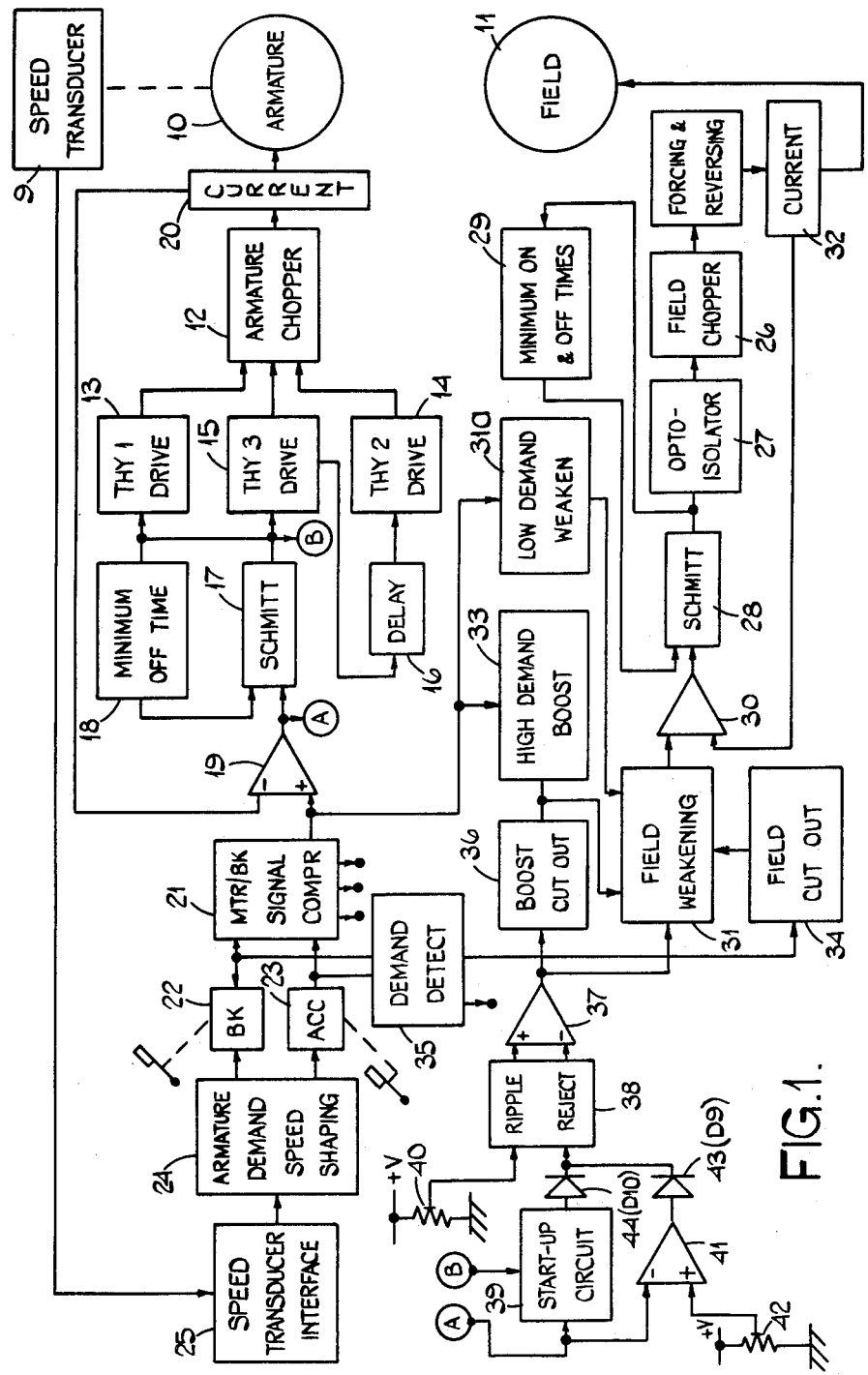
FIG. 1 is a block diagram of one part of an example of a control circuit in accordance with the invention.

Dealing firstly with FIG. 1 the control circuit includes interlinked controls for the armature current and field current of a traction motor having a separate armature 10 and field winding 11. The armature 10 is energised from a high voltage battery by a chopper circuit 12 (shown in detail in FIG. 7). The chopper circuit 12 is controlled in turn by three thyristor circuits 13, 14, 15, the circuit 14 being arranged to operate after a fixed delay (set by a circuit 16) after the circuit 15. The circuits 13, 14, 15 are controlled by a trigger circuit 17 which has a minimum off-time generator circuit 18 associated with it. The trigger circuit 17 in turn is fed with a current error signal from an armature current difference amplifier 19 which compares a current demand signal with a signal derived from an armature current transducer 20. The circuits 13 to 19 inclusive are shown in detail in FIG. 6.

Figure 3:
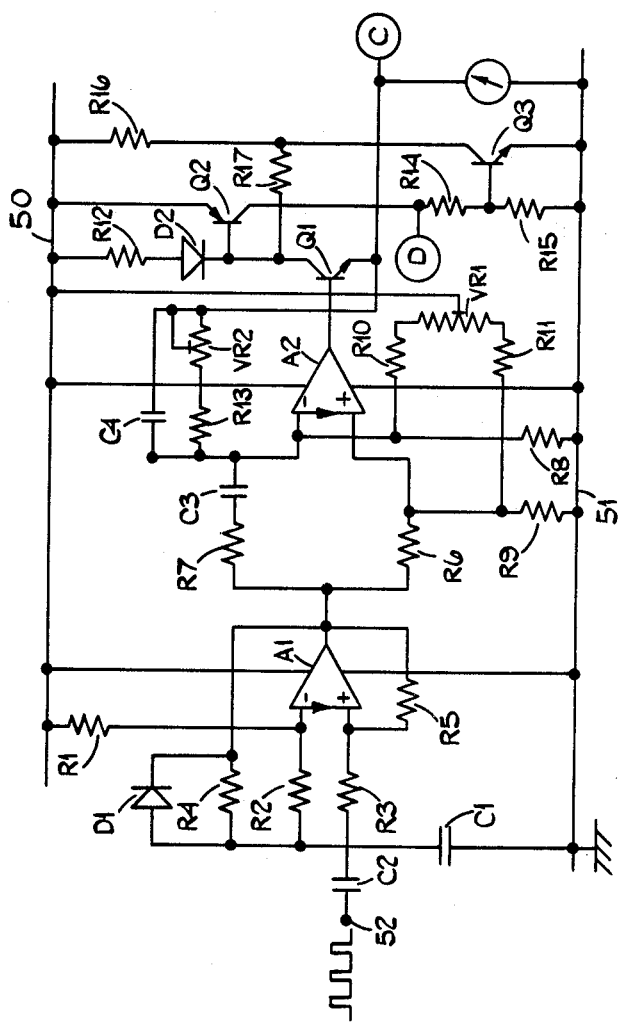
Figure 4:
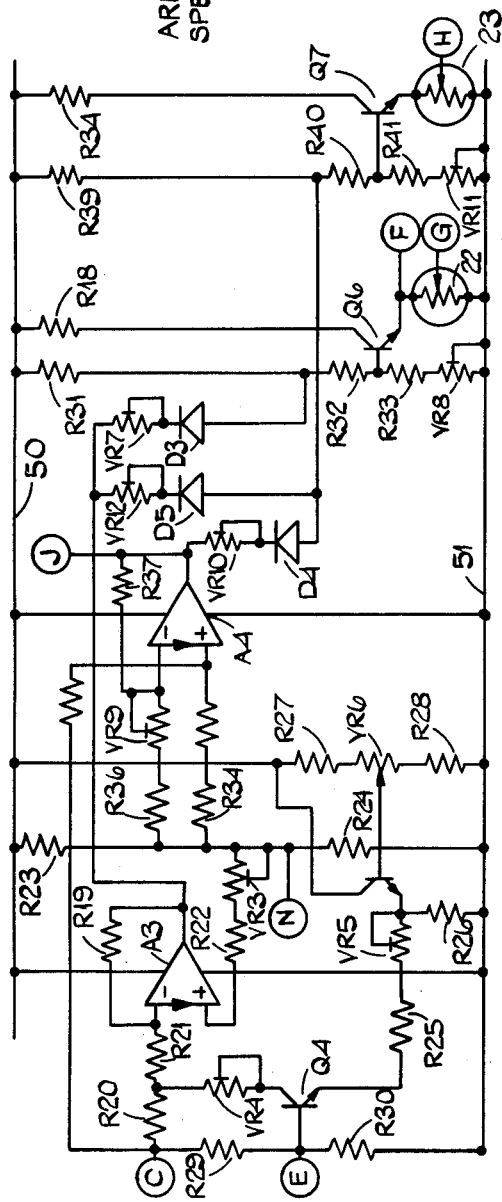

The current demand signal fed to the difference amplifier 19 is derived by a motor/brake comparator 21 (FIG. 5) which receives input signals from two foot pedal operated potentiometers 22, 23 to which speed dependent signals are fed by a demand speed shaping circuit 24 (see FIG. 4). The circuit 24 receives its input from a speed transducer interface circuit 25 receiving a frequency signal from a speed transducer 9 driven by the motor and providing a signal voltage proportional to speed (see FIG. 3).

Figure 8:
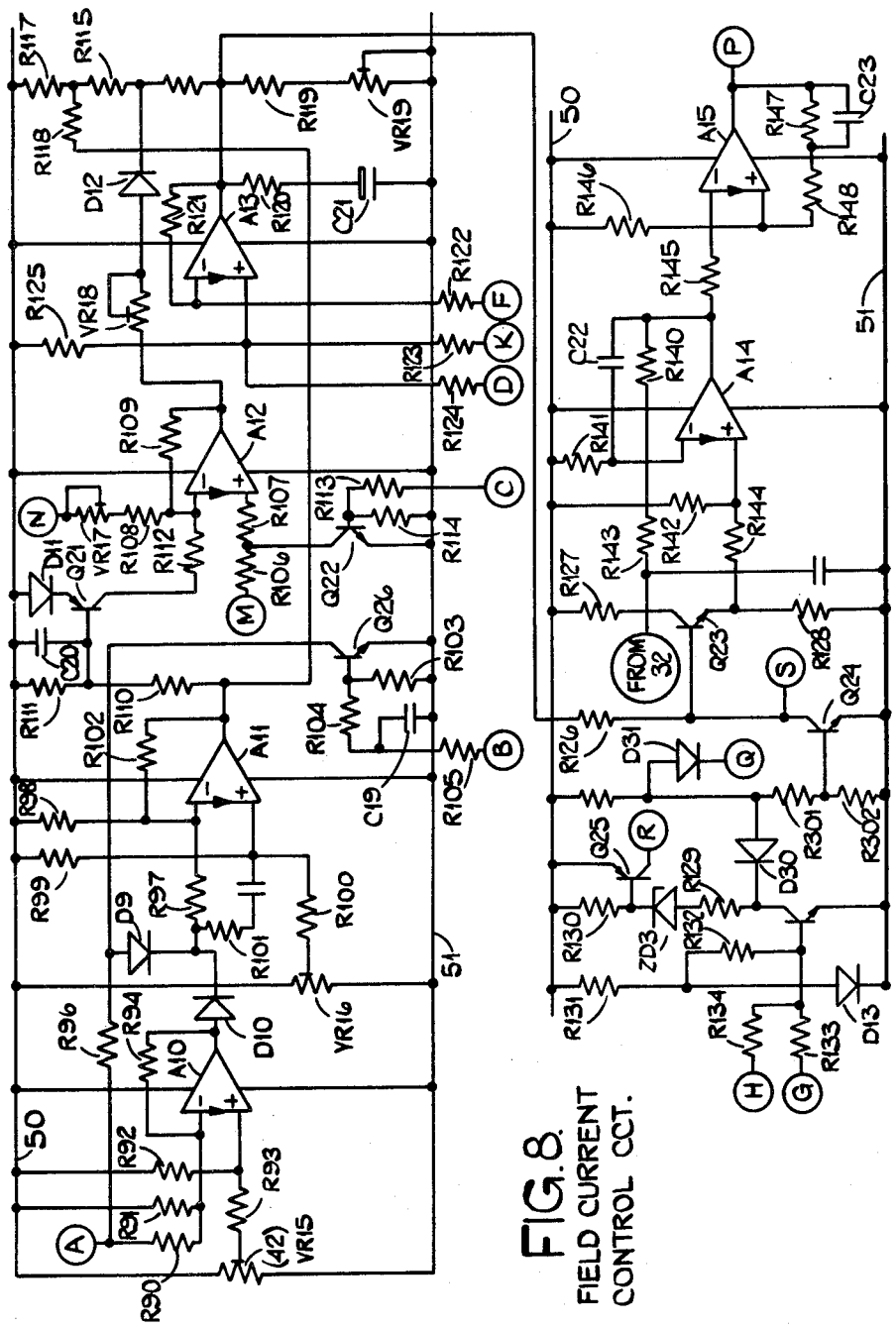

The field current is controlled by a field chopper circuit 26 (FIG. 9) controlled through an opto-isolator 27 (FIG. 9) from a trigger circuit 28 (FIG. 8) with which there is associated a minimum on time and minimum off time generating circuit 29 (FIG. 8). A field current difference amplifier 30 (FIG. 8) supplies the trigger circuit 28 with its input signal, receiving input signals from a field current demand control circuit constituted by field weakening circuit 31 and from an field current transducer 32. Associated with the circuit 31 is a circuit 31a for decreasing the field current demand signal at low armature current demand, and a boost circuit 33 for boosting the field current demand signal at high armature current demand. Circuits 31a and 33 are controlled by the output of the comparator circuit 21. A field cut out circuit 34 controlled by an armature demand detector 35 (from the potentiometers 22, 23) controls the circuit 31 to remove the field current demand when there is no armature current demand. A boost cut out circuit 36 is connected to override the boost circuit 33 under the control of a difference amplifier 37 which also provides an input to the circuit 31. The difference amplifier 37 receives inputs via a ripple rejection circuit 38 from a preset reference voltage 40 via a start up circuit 39 from the output of the armature current difference amplifier 19. A brake field weakening difference amplifier 41 compares the output of the amplifier 19 with a different fixed reference voltage 42 and the output of the amplifier 41 is combined via diodes 43, 44 with that of the start up circuit so that the larger signal at any time is actually fed to the amplifier 37 via the ripple rejection circuit.

Turning now to FIG. 3, the speed transducer interface includes an operational amplifier A1 with its power terminals connected between a positive supply rail 50 and an earth rail 51. The inverting input terminal of the amplifier A1 is connected via a resistor R1 to the rail 50 and via a resistor R2 and a capacitor C1 in series to the rail 51. The non-inverting input terminal of the amplifier A1 is connected by a resistor R3 and a capacitor C2 to the output terminal 52 of the speed transducer 9. Negative feedback is provided by a resistor R4 and a diode D1 in parallel between the output terminal of the amplifier A1 to the junction of the resistor R2 and the capacitor C1 and positive feedback is provided by a resistor R5 connected between the output terminal and the non-inverting input terminal of the amplifier A1.

The output terminal of the amplifier A1 is connected by a resistor R6 to the non-inverting input terminal of an operational amplifier A2 and by a resistor R7 and capacitor C3 in series to the inverting input terminal of that amplifier. These inverting and non-inverting input terminals are connected by resistors R8, R9 respectively to the rail 51 and are connected together by a series circuit of a variable resistor VR1 and two padding resistors R10, R11, the variable point of the resistor VR1 being connected to the rail 50. The output terminal of the amplifier A2 is connected to the base of an n-p-n transistor Q1 with its collector connected via a resistor R12 and a diode D2 in series to the rail 50. The emitter of the transistor Q1 is connected to a terminal C and also, by a variable resistor VR2 and resistor R13 in series to the inverting input terminal of the amplifier A2. A capacitor C4 is connected across the resistors R13 and VR2 to provide smoothing of the pulse train applied to the amplifier A2 by the amplifier A1. The amplifier A1 and its associated components forms a monostable, which responds to a positive going edge via R3, C2, by producing a fixed width pulse at the output. The output waveform is thus a train a constant width pulses, the average value of which is proportional to the number of pulses at the input 52, and to vehicle speed. The amplifier A2 forms an integrator and averages the wave form at the output of A1. Q1 is an emitter follower, which provides a low impedance output, so that the voltage at terminal C is directly proportional to the frequency of the pulses from the transducer 21, (i.e. to the motor speed).

The circuit of FIG. 3, also includes a switch circuit constituted by two complementary transistors Q2 and Q3 and associated resistors to provide an output to a terminal D (to FIG. 10) when the motor is not stationary. The p-n-p transistor Q2 has its base connected to the collector of the transistor Q1, its emitter connected to the rail 50 and its collector connected by two resistors R14, R15 in series to the rail 51. The n-p-n transistor Q3 has its base connected to the common point of resistors R14, R15, its emitter connected to the rail 51 and its collector connected by a load resistor R16 to the rail 50. A feedback resistor R17 is connected between the collector of the transistor Q3 and the base of the transistor Q2. Whenever the output of the amplifier A2 rises above its off level, which occurs whenever pulses are being received from the transducer 9, the transistor Q1 starts turning on. The diode D2 biases the transistor Q2 to the verge of conduction so that any current in resistor R12 as transistor Q1 turns on turns transistor Q2 on. This in turn turns transistor Q3 on and the resistor R17 provides positive feedback to switch transistor Q2 hard on. Thus the signal at terminal D (at the collector of transistor Q2) goes high whenever the motor is not stationary.

Turning now to FIG. 4 the armature demand speed shaping circuit includes two operational amplifiers A3, A4 for controlling the signals applied to the motoring and braking potentiometers 22, 23 respectively. The terminal C is connected via two resistors R20, R21 in series to the inverting input terminal of the amplifier A3 which has a negative feedback resistor R19, the non-inverting input terminal of which is connected by a resistor R22 and a variable resistor VR3 in series to the common point of a series resistor chain R23, R24 connected between the rails 50, 51. The common point of the resistors R20, R21 is connected by a variable resistor VR4 to the collector of an n-p-n transistor Q4 the emitter of which is connected by a resistor R25 and a variable resistor VR5 in series to the emitter of an n-p-n transistor Q5 with its emitter connected to the rail 51 by a resistor R26. The collector of the transistor Q5 is connected to the rail 50 and its base is connected to the variable point of a variable resistor VR6 connected in series with two padding resistors R27, R28 between the rails 50, 51. The base of the transistor Q4 is connected to the common point of two resistors R29, R30 connected in series between the terminal C and the rail 51. The output terminal of the amplifier A3 is connected by a variable resistor VR7 and a diode D3 in series to a point on a resistor chain R31, R32, R33 and VR8 between the rails 50, 51, which point is common to resistors R31 and R32. The common point of resistors R32, R33 is connected to the base of an n-p-n transistor Q6 connected as an emitter follower with its collector connected to the rail 50 via a resistor R18 and its emitter connected by the motoring pedal potentiometer 22 to the rail 51. The emitter of the transistor Q6 is also connected to a terminal F of FIG. 8. The voltage at the terminal is at a maximum level when the speed is zero at which point the output voltage of the amplifier A3 is higher than the voltage at the junction of resistors R31 and R32 determined by the setting of the variable resistor VR8. As the speed rises the output of the amplifier A3 falls until diode D3 starts to conduct which causes the voltage at F to fall linearly with rising voltage. At a speed determined by the setting of the potentiometer VR6 the transistor Q4 will start to conduct and the current which it carries increases linearly with rising speed until the current which was previously carried by transistor Q5 is carried by transistor Q4 whereafter the transistor Q5 turns off. During this phase the output of the amplifier A3 remains constant, but once transistor Q5 has turned off the voltage at terminal F falls linearly again with rising speed.

The amplifier A4 has its non-inverting input terminal connected to the junction of the resistors R23, R24 by a resistor R34 and to the terminal C by a resistor R35. The inverting input terminal of the amplifier A4 is connected by a resistor R36 and a variable resistor VR9 in series. A feedback resistor R37 is connected between the inverting input terminal and the output terminal of the amplifier A4. The output terminal of the amplifier A4 is connected by a variable resistor VR10 and a diode D4 in series to the junction of two resistors R39, R40 connected in a chain with a resistor R41 and a variable resistor VR11 between the rails 50, 51. The output terminal of the amplifier A3 is connected to the same point by a variable resistor VR12 and a diode D5 in series. A transistor Q7 has its base connected to the junction of the resistors R40, R41 and its emitter connected by the brake pedal potentiometer 23 to the rail 51. The collector of the transistor Q7 is connected to the rail 50 via a resistor R34. The slider of the potentiometer 23 is connected to a terminal H. The output terminal of the amplifier A4 is connected to a terminal J. The voltage at the emitter of the transistor Q7 is zero when the speed is zero and then rises linearly until it reaches the level set by the variable resistor VR11. Thereafter the voltage follows that at the terminal F although the slope of the falling portions may be set differently by adjustment of the variable resistor VR12.

Figure 5:
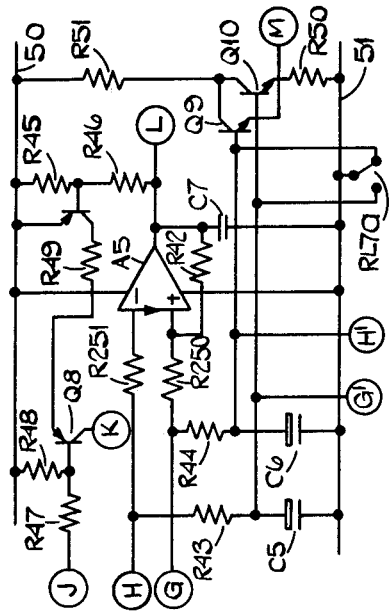

Turning now to FIG. 5 the circuit shown includes an operational amplifier A5 connected as a comparator with a resistor R42 connected between its output terminal and its non-inverting input terminal. The non-inverting and inverting input terminals of the amplifier A5 are connected to the terminals G and H respectively via resistor R250, R251, these terminals also being connected to the rail 51 by respective series circuits each consisting of a resistor R43, R44 and a capacitor C5, C6. The output terminal of the amplifier A5 is also connected to the rail 50 by a pair of resistors R45, R46 in series, to the rail 51 by a capacitor C7, and to a terminal L. The terminal J is connected to the base of a p-n-p transistor Q8 by a resistor R47, a resistor R48 connecting the base of transistor Q8 to the rail 50. The emitter of the transistor Q8 is connected by a resistor R49 to the collector of a p-n-p transistor Q9 the emitter of which is connected to the rail 50 and the base of which is connected to the junction of the resistors R45, R46. The collector of the transistor Q8 is connected to a terminal K, which is at a high signal level whenever the speed is below a predetermined level and the signal at terminal H is higher than that at terminal G (indicating that braking has been selected).

The resistors R43, R44 connect the terminals H, G to the bases of two transistors Q10, Q11, the emitters of which are connected by a common resistor R50 to the rail 51 and the collectors of which are connected by a common resistor R51 to the rail 50. The emitters of the transistors are connected to a terminal M, the signal at which is the armature current demand signal and follows the larger of the signals at G and H. The capacitors C5, C6 limit the rate at which the demand signal can vary following a step change at the positions of the pedals.

Figure 6:
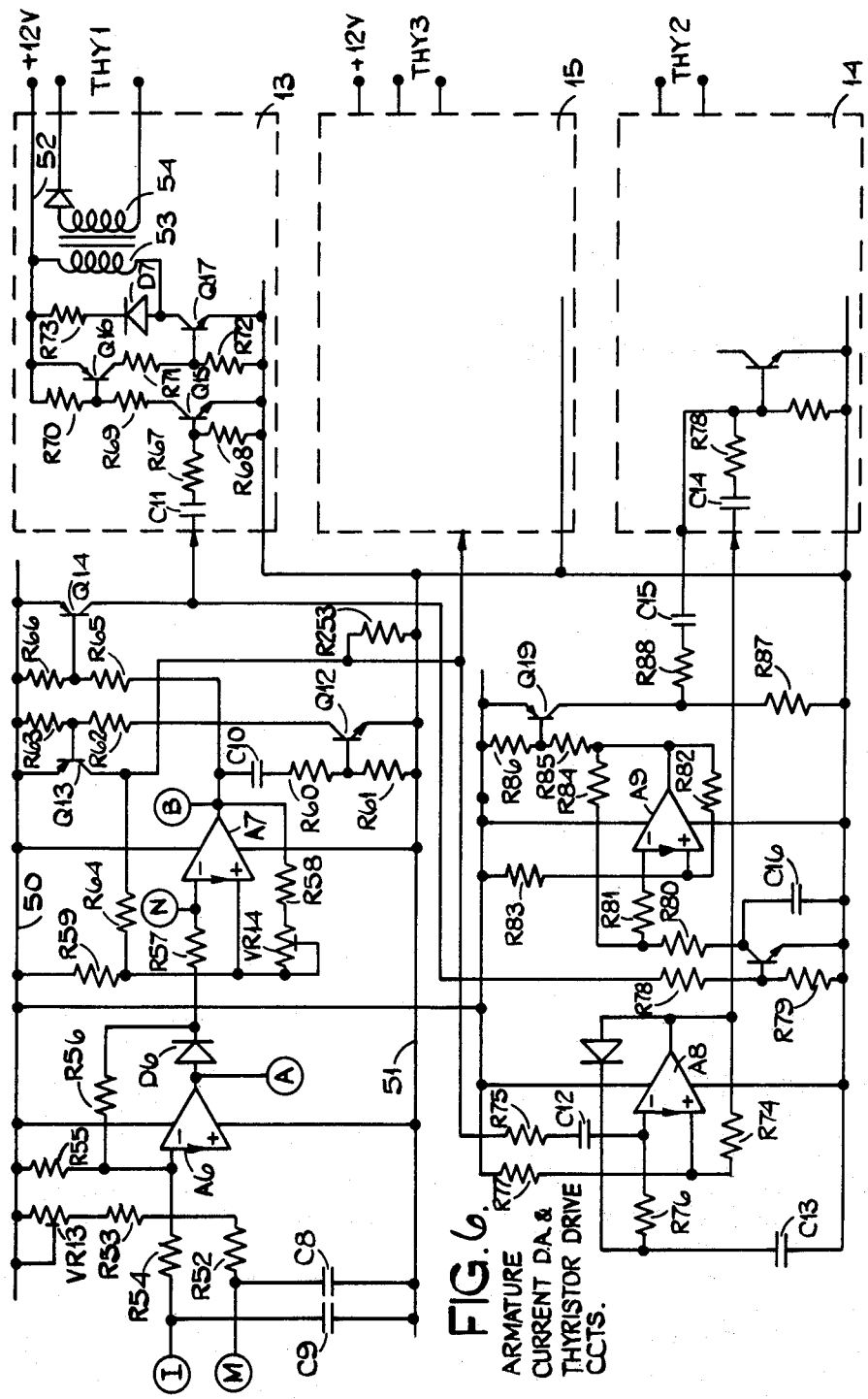

Turning now to FIG. 6, the terminal M is connected to the rail 51 by a capacitor C8 and to the non-inverting input terminal of an operational amplifier A6 by a resistor R52. The non-inverting input terminal of the amplifier A6 is connected to the rail 50 by a resistor R53 and a variable resistor VR13. The inverting input terminal of the amplifier A6 is connected by a resistor R54 to a terminal I from the armature current transducer 20 and to the rail 50 by a resistor R55. A capacitor C9 connects the terminal I to the rail 51. The output terminal of the amplifier A6 is connected to a terminal A and to the anode of a diode D6 and a feedback resistor R56 connects the cathode of the diode D6 to the inverting input terminal so that the amplifier A6 acts as the differential amplifier 19.

The cathode of the diode D6 is also connected by a resistor R57 to the inverting input terminal of an operational amplifier A7 acting as Schmidt bistable trigger circuit 18. Positive feedback around the amplifier A7 is provided by a resistor R58 in series with a variable resistor VR14 between the output terminal of amplifier A7 and its non-inverting input terminal, which is also connected by a resistor R59 to the rail 50. The output terminal of the amplifier A7 is connected by a capacitor C10 and two resistors R60 and R61 in series to the rail 51. An n-p-n transistor Q12 has its base connected to the junction of the resistors R60, R61 and its emitter connected to the rail 51. The collector of the transistor Q12 is connected by two resistors R62, R63 in series to the rail 50 and a p-n-p transistor Q13 has its base connected to the junction of the resistors R62, R63 and its emitter connected to the rail 50. The collector of the transistor Q13 is connected by a resistor $R_{253}$ to rail 51 and by a resistor R64 to the non-inverting input terminal of the amplifier A7 to provide transient positive feedback to hasten switching of the amplifier A7 between its two states, and also to provide a minimum off time for the trigger circuit since the transient positive feedback does not disappear until the capacitor C10 stops charging following switching on of the Schmidt trigger. The output terminal of the amplifier A7 is connected by two resistors R65, R66 in series to the rail 50 and the junction of these resistors is connected to the base of a p-n-p transistor Q14 with its emitter connected to the rail 50.

The collector of the transistor Q14 is connected to the drive circuit 13 which is constituted by an input capacitor C11 connected to two resistors R67, R68 in series between the capacitor C11 and the rail 51. The junction of these resistors is connected to the base of an n-p-n transistor Q15 with its emitter connected to the rail 51 and its collector connected by two resistors R69, R70 in series to a 12 V rail 52. A p-n-p transistor Q16 has its base connected to the junction of the resistors R69, R70 with its emitter connected to the rail 52 and its collector connected by two resistors R71, R72 in series to the rail 51. A transistor Q17 has its base connected to the junction of the resistors R71, R72 and its emitter connected to the rail 52. The collector of the transistor Q17 is connected by a transformer primary winding 53 to the rail 51, a freewheel diode D7 being connected in series with a resistor R73 across this.

A pulse is produced in the secondary winding 54 of this transformer whenever the current feedback signal at the terminal I falls sufficiently far below the armature current demand signal at the terminal M sufficiently to reverse the circuit around amplifier A7, thereby turning on the transistor Q14.

The drive circuits 14 and 15 are identical to the circuit 13 but are differently connected with the trigger circuit. In the case of the circuit 15 the input to the circuit is taken from the collector of the transistor Q13 so that a positive going pulse appears in the secondary winding of the transformer in circuit 15 whenever the transistor Q13 comes on, which occurs briefly when the current feedback signal at terminal I exceeds the demand signal at terminal M by a sufficient margin to return the trigger circuit around the amplifier A7 to its original condition.

The circuit 14 produces an output, a fixed delay after the circuit 15, and periodically whilst the transistor Q14 is switched off (i.e. whilst the actual current is above the demanded current by the margin set by the hysteresis of the Schmidt trigger (around A7)). The fixed delay function is obtained by an operational amplifier A8 connected as a monostable circuit with a positive feedback resistor R74. The inverting input terminal of the amplifier A8 is connected by a capacitor C12 and a resistor R75 in series to the collector of the transistor Q13. A capacitor C13 is connected at one side to the rail 51 and at the other side by a resistor R76 to the inverting input terminal of the amplifier A8. A diode D8 has its anode connected to the output terminal of the amplifier A8 and its cathode connected to the junction of the resistor R76 and the capacitor C13. A resistor R77 connects the non-inverting input terminal of the amplifier A8 to the rail 50. The output terminal of the amplifier A8 is connected to the capacitor C14 of the circuit 14. When the transistor Q13 switches on as aforesaid, the output of the amplifier A8 goes low and capacitor C13 discharges slowly until the amplifier A8 switches to provide a high output which operates circuit 14.

The other form of operation of the circuit 14 is performed by an operational amplifier A9 connected as a voltage comparator. The collector of the transistor Q14 is connected by two resistors R78, R79 in series to the rail 51 and their junction is connected to the base of an n-p-n transistor Q18 with its emitter connected to rail 51 and its collector connected by two resistors R80, R81 in series to the inverting input terminal of the amplifier A9. The non-inverting input terminal of the amplifier A9 is connected to its output terminal by a resistor R82 and to the rail 50 by a resistor R83. The output terminal of the amplifier A9 is connected by a resistor R84 to the junction of resistors R80 and R81 and by a pair of resistors R85, R86 in series to the rail 50. The base of a p-n-p transistor Q19 is connected to the junction of resistors R85, R86 and its emitter is connected to the rail 50. The collector of the transistor Q19 is connected to the rail 51 by a resistor R87 and, by a resistor R88, to a second input capacitor C15 of the circuit 14. A capacitor C16 is connected between the collector of the transistor Q18 and the rail 51. The resistor R82 provides immediate positive feedback around the amplifier A9 and the resistor R84 and capacitor C16 provide delayed feedback whenever the transistor Q18 is off.

Figure 7:
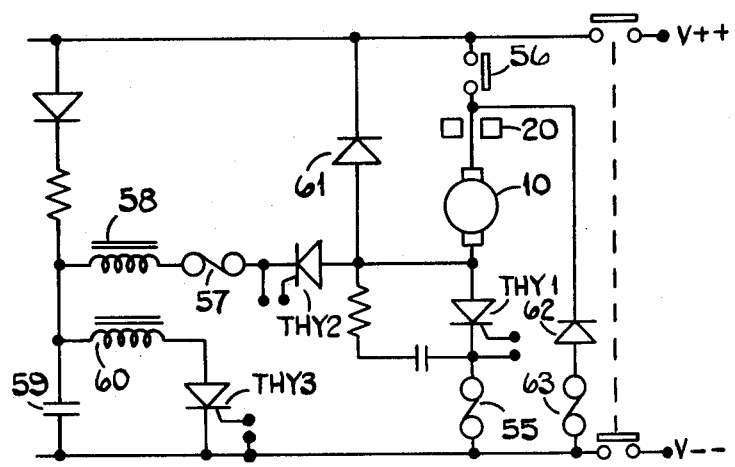

FIG. 7 shows the actual armature chopper circuit which includes three thyristors Th1, Th2 and Th3 controlled by the drive circuits 13, 14, and 15 respectively. The thyristor Th1 is connected between one side of the armature winding 10 and a fuse 55 (connected to a −supply rail), the other side of the winding 10 being connected by a contact 56 to a positive supply rail. The thyristor Th2 has its anode connected to the anode of the thyristor Th1 and its cathode connected by a fuse 57 an inductor 58 and a capacitor 59 in series to the −supply rail. The third thyristor Th3 has its cathode connected to the −supply rail and its anode connected by an inductor 60 to the junction of the inductor 58 and the capacitor 59. Said one side of the armature is connected via a diode 61 to the +rail and the other side is connected by a diode 62 and fuse 63 in series to the −rail.

When thyristor Th1 is fired current starts to flow through the armature. When thyristor Th2 is fired the armature current is diverted into the capacitor 59 which has previously been reversed charged so that the thyristor Th1 can switch off. Reverse charging of the capacitor 59 is achieved when the thyristor Th3 is fired.

Turning now to FIG. 8 terminal A of FIG. 6 is connected by a resistor R90 to the inverting input terminal of an operational amplifier A10 connected as a difference amplifier. Both the inverting and non-inverting input terminals of this amplifier A10 are connected by respective resistors R91 and R92 to the rail 50, the non-inverting input terminal being connected via a resistor R93 to the slider of a variable resistor VR15 connected between the rails 50, 51. The signal at terminal A is normally a triangular wave superimposed on a fixed d.c. level and the amplifier A10 is intended to detect when the voltage at A falls below a limit set by the variable resistor VR15 to indicate that too high an armature current is flowing during braking. The amplifier A10 has negative feedback provided by a resistor R94 between the output terminal of the amplifier A10 and its inverting input terminal.

The terminal A is also connected by a resistor R96 to the anode of a diode D9 with its cathode connected to the inverting input terminal of an amplifier A11 (also connected as a difference amplifier), by a resistor R97. A diode D10 has its anode connected to the output terminal of the amplifier A10 and its cathode connected to the cathode of the diode D9. Both of the inverting and non-inverting input terminals of the amplifier A11 are connected to the rail 50 by resistors R98 and R99 respectively. The non-inverting input terminal of the amplifier A11 is connected by a resistor R100 to the variable point of a variable resistor VR16 which corresponds to the potentiometer 40 of FIG. 1. The ripple rejection circuit 38 of FIG. 1 is constituted by a resistor R101 and a capacitor C17 connected in series between the cathodes of the diodes D9 and D10 and the non-inverting input terminal of the amplifier A11. Negative feedback around the amplifier A11 is provided by a resistor R102 connected between the output terminal of the amplifier A11 and the inverting input terminal thereof.

The start up circuit is constituted by a transistor Q20 with its collector connected to the anode of the diode D9 and its emitter connected to the rail 51. The transistor Q20 is biased off by a resistor R103 connected between its base and the rail 51 but can be turned on by a signal from the terminal B of the Schmidt bistable circuit (i.e. the output of amplifier A7). The terminal B is connected to the base of transistor Q20 by two resistors R104 and R105 in series with the common point of these resistors connected by a capacitor C19 to the rail 51. When the transistor Q20 is conducting there can be no input from the terminal A to the amplifier A11.

The amplifier A11 is operative during forward motoring and compares the smoothed output of the amplifier A6 with the fixed voltage set on the variable resistor VR16. The signal at A decreases as the armature current increases because of the operation of the amplifier A6. Consequently the output of amplifier A11 is usually high, and decreases only when the average armature current fails to achieve the level demanded.

The amplifier A10 operates during braking and compares the signal at the terminal A with that set by the resistor VR15. The output of amplifier A10 goes high if the armature current exceeds the demand value by a predetermined amount set by the resistor VR15. When the output of the amplifier A10 is higher than the voltage at the terminal A the amplifier A10 will take over control of the amplifier A11 since the diodes D9 and D10 will operate as a highest wins gate.

The output terminal of the amplifier A11 is connected to the boost circuit 33, which is constituted by an amplifier A12 connected as a difference amplifier. To this end the amplifier A12 has its non-inverting input terminal connected to the terminal M (from FIG. 5) via two resistors R106, R107 in series. The inverting input terminal of the amplifier A12 is connected via a resistor R108 and a variable resistor VR17 in series to a terminal N which is at the junction of the resistors R23 and R24 in FIG. 4. A resistor R109 is connected between the output terminal of the amplifier A12 and its inverting input terminal.

The amplifier A12 operates to provide a high output signal whenever the armature current demand signal M exceeds a level determined by the setting of the resistor VR17. This high output is used to boost the field current as will be explained hereinafter.

The output terminal of the amplifier A11 is connected via the resistors R110 and R111 in series to the rail 50, the common point of these resistors being connected via a capacitor C20 to the rail 50 and being also connected to the base of a p-n-p transistor Q21. The emitter of the transistor Q21 is connected to the rail 50 via a diode D11 and its collector is connected by a resistor R112 to the inverting input terminal of the amplifier A12. Thus when the output of the amplifier A11 falls as it does during the two conditions mentioned above the transistor Q21 will turn on and the non-inverting input terminal of the amplifier A12 will then effectively be connected to the rail 50 by the resistor R112 so that the output of the amplifier A12 will go low.

The interconnection of the resistors R106 and R107 is connected to the collector of a n-p-n transistor Q22 the emitter of which is connected to the rail 51. The base of the transistor Q22 is connected to the common point of two resistors R113 and R114 connected between the terminal C of FIG. 3 and the rail 51. The transistor Q22 turns on when the speed is above a predetermined level so that the signal from the terminal M via the resistor R106 is grounded and the output of the amplifier A12 goes low.

The output of the amplifier A12 is connected by a variable resistor VR18 and a diode D12 to the junction of two resistors R115 and R116. The other end of the resistor R115 is connected via a resistor R117 to the rail 50 and to the junction of the resistors R115 and R117 there is connected a resistor R118 connected to the output terminal of the amplifier A11. The opposite end of the resistor R116 is connected by a resistor R119 and a variable resistor VR19 in series to the rail 51. Connected to the junction of the resistors R116 and R119 is the output terminal of an operational amplifier A13, such output terminal also being connected to the rail 51 by a resistor R120 and a capacitor C21 in series. The inverting input terminal of the amplifier A13 is connected by a resistor R121 to its output terminal and by a resistor R122 to the terminal F of FIG. 4. The non-inverting terminal of the amplifier A13 is connected by a resistor R123 to the terminal K of FIG. 5, by a resistor R124 to the terminal D of FIG. 3 and by a resistor R125 to the rail 50.

The output terminal of the amplifier A13 is connected via a resistor R126 to the base of a transistor Q23. The collector of this transistor is connected by a resistor R127 to the rail 50 and its emitter is connected by a resistor R128 to the rail 51. The base of a transistor Q24 is connected to the common point of two resistors R301 and R302 connected in series with a further resistor R303 between the rails 50 and 51. The common point of the resistors R301 and R303 is connected by a diode D31 to a terminal Q and is also connected by a diode D30 (both diodes D30, D31 having their anodes connected to this common point) to the collector of a transistor Q26 which has its emitter connected to the rail 51 and its base connected by a resistor R132 to the anode of a diode D13 (which has its cathode connected to the rail 51) such anode being connected by a resistor R131 to the rail 50. The base of the transistor Q26 is also connected to terminal G and H (FIG. 4) by resistors R133 and R134 respectively. The collector of the transistor Q26 is also connected by a resistor R129 and a zener diode ZD3 in series to the base of a pnp transistor Q25 which base is also connected to the rail 50 by a resistor R130. The emitter of the transistor Q25 is connected to the rail 50 and its collector is connected to a terminal R. The collector of the transistor Q24 is connected to the base of the transistor Q23 and also to a terminal S.

Transistor Q26 is turned on when either of the braking or motoring pedals is depressed and current passed by the resistor R303 thus flows through the transistor Q26 and prevents transistor Q24 from being turned on. When transistor Q26 is not turned on, however, the transistor Q24 turns on and grounds the base of the transistor Q23 so that the field current demand signal from the amplifier A13 is not passed forward in the circuit.

FIG. 8 also shows the field current differential amplifier 30 of FIG. 1 which is constituted by an operational amplifier A14 with a resistor R140 and a capacitor C22 providing negative feedback between its output terminal and its inverting input terminal. Both input terminals of the amplifier A14 are connected to the rail 51 by resistors R141 and R142 respectively and the inverting input terminal is connected to the output terminal of the field current transducer 32, by a resistor R143. The non-inverting input terminal of the amplifier A14 is connected to the emitter of the transistor Q23 by a resistor R144.

The amplifier A15 shown in FIG. 8 is the Schmidt bistable circuit 28 of FIG. 1. This consists of a resistor R145 which connects the inverting input terminal of the amplifier A15 to the output terminal of the amplifier A14, a resistor R146 which connects the non-inverting input terminal of the amplifier A15 to the rail 50 and two resistors R147 and R148 in series between the output terminal of the amplifier A15 and its non-inverting input terminal, with a capacitor C23 connected across the resistor R147. The output terminal of the amplifier A15 is connected to a terminal P shown in FIG. 9.

Figure 9:
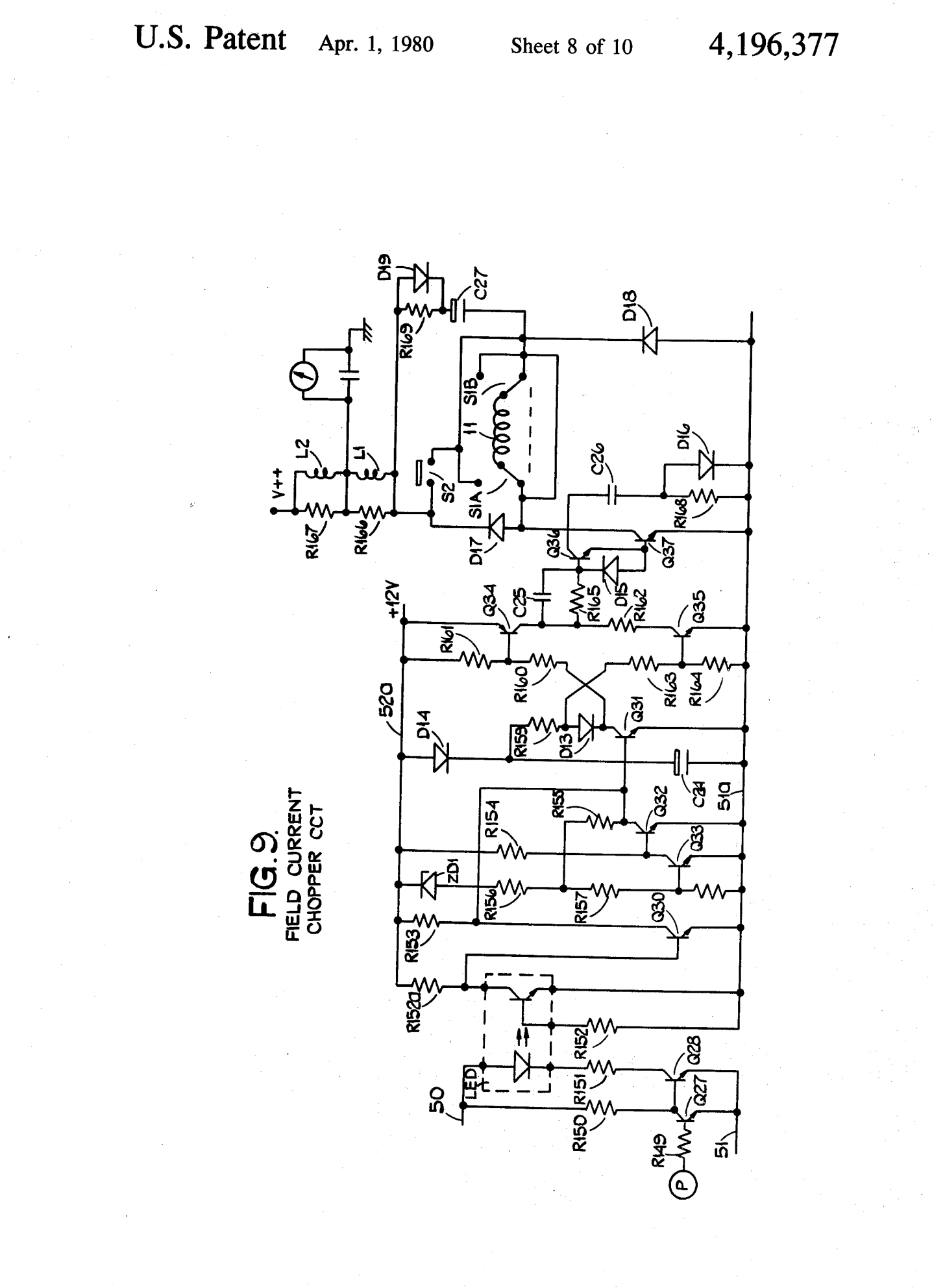

In FIG. 9 the terminal P is shown connected by a resistor R149 to the base of an n-p-n transistor Q27 with its emitter grounded to the rail 51 and its collector connected to the rail 50 by a resistor R150. The collector of the transistor Q27 is connected to the base of a transistor Q28 with its emitter connected to rail 51 and its collector connected via a resistor R151 to the cathode of a light emitting diode LED of the opto-isolator 27. The anode of the diode LED is connected to the rail 50. The base of the light sensitive transistor Q29 of the opto-isolator 27 is connected by a resistor R152 to the isolated earth rail 51a. The emitter of the transistor Q29 is connected directly to the rail 51a and its collector is connected via a resistor R152a to the 12V rail 52a. The collector of the transistor Q29 is also connected to the base of a n-p-n transistor Q30 with its emitter connected to the rail 51a and its collector connected to rail 52a by a resistor R153. The collector of the transistor Q30 is connected to the base of a transistor Q31 which is also connected to the collector of a transistor Q32 with its emitter connected to the rail 51a and its base connected to the collector of a transistor Q33 which has its emitter connected to the rail 51a. The collector of the transistor Q33 is connected by a resistor R154 to the rail 52a and the collector of the transistor Q32 is connected via a resistor R155 to the common point of two series resistors R156 and R157. The opposite end of the resistor R156 is connected to the anode of a zener diode ZD1 the cathode of which is connected to the rail 52a. The opposite end of the resistor R157 is vonnected via a further resistor R158 to the rail 51a the common point of these two resistors being connected to the base of the transistor Q33.

The emitter of the transistor Q31 is connected to the rail 51a and its collector is connected to the cathode of a diode D13 with its anode connected via a resistor R159 to the cathode of a diode D14 with its anode connected to the rail 52a. The cathode of the diode D14 is connected to one side of a capacitor C24 the other side of which is connected to the rail 51a. The collector of the transistor Q31 is also connected via two resistors R160 and R161 in series to the rail 52a, the common point of these resistors being connected to the base of a p-n-p transistor Q34 with its emitter connected to the rail 52a and its collector connected via a resistor R162 to the collector of a n-p-n transistor Q35 which has its emitter connected to the rail 51a. The base of the transistor Q35 is connected to the common point of two resistors R163 and R164 connected in series between the rail 51a and the anode of the diode D13.

The signal at the terminal P rises when the field current is too high and falls when the field current is too low. The portion of FIG. 9 thus far described isolates the control circuit of FIG. 8 from the high voltage field chopper circuit of FIG. 9 and provides conversion to push-pull operation.

The collector of the transistor Q34 is connected by a resistor R165 and a capacitor C25 in parallel to the base of a drive transistor Q36 the emitter of which is connected to the base of a power transistor Q37 with its emitter connected to the rail 51a. A protective diode D15 is connected between the emitter and base of the transistor Q36. The collectors of the two transistors Q36 and Q37 are connected together and to two contacts of a two-pole two-way switch S1A, and S1B. The common contact of the two poles of the switch S1A, S1B are interconnected by the field winding 11 and the remaining contacts are connected together and via a switch S2, to a high voltage supply rail. This rail is connected to the positive terminal of the main traction battery via two inductors L1 and L2 in series, each inductor being bridged by a low value resistor R166, R167. A capacitor C26 connects the collectors of the transistors Q36 and Q37 to the anode of a diode D16 the cathode of which is earthed to the rail 51a. A resistor R168 is connected across the diode D16. A power diode D17 has its anode connected to the collectors of the transistors Q36 and Q37 and its cathode connected to the high voltage supply rail. A further power diode D18 has its cathode connected to one contact of the switch S2 and its anode connected to the rail 51a. A capacitor C27 has one side connected to the anode of the diode D18 and the other side connected to the cathode of a diode D19 which has its anode connected to the high voltage supply rail. A resistor R169 bridges this diode D19.

As will be explained in more detail hereinafter the switches S1 and S2 determine the mode in which the motor runs. In the position of the switches shown the field winding is connected for forward running, the diode D17 acting as a recirculating diode. When the switch S2 is changed to its alternative position (which can only occur when the transistors Q36 and Q37 are not conducting) e.m.f. induced in the winding 11 goes to charge the battery and this causes the flux in the winding to decay quickly. The switch S1 is only operated when the current is at a suitably low value and when the switch S2 is changed from the position shown to provide either electrical braking or reverse running.

Figure 2:
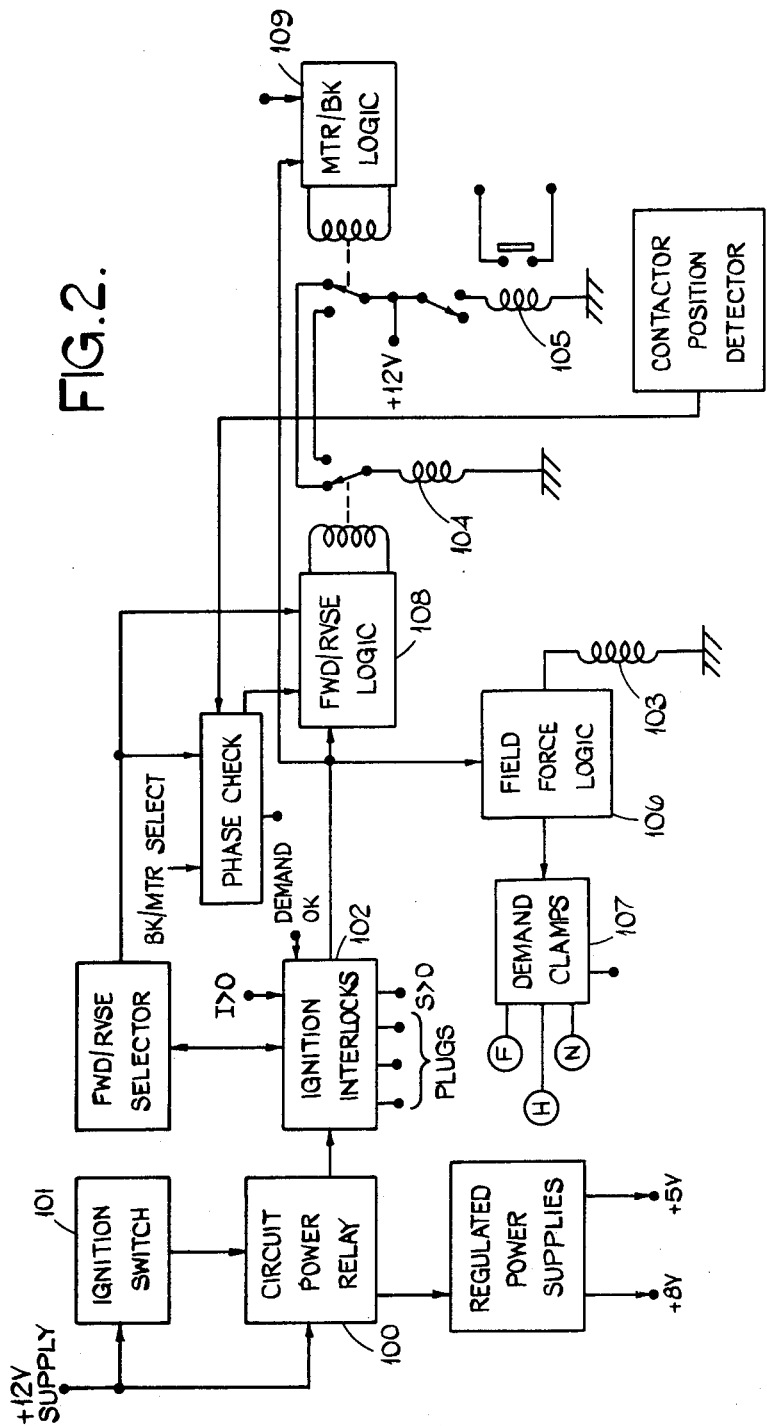
FIG. 2 is a block diagram of the remainder of the circuit of FIG. 1.

Turning now to FIG. 2 the circuits shown operate primarily to protect the motor and control circuit against improper operation by providing various interlocks. The supply of power to the whole control circuit is determined primarily by a power relay circuit 100 controlled by an ignition switch 101. An interlock circuit 102 ensures that the relay winding 103 controlling the switch S2, the relay winding 104 controlling the switches S1A and S1B and the contactor 105 controlling the contact 56 in FIG. 7 cannot be operated unless certain conditions to be described hereinafter are satisfied. These conditions are that interlocks operated by plugs on the current transducers 20 and 32 and the speed transducer 9 are properly engaged. The field force relay is controlled by a field force logic circuit 106 which also controls a series of demand clamps 107 as will be explained hereinafter to short to earth the signals from the brake and accelerator pedal potentiometers and also to prevent operation of the Schmidt trigger 17. The relay 104 is controlled by forward/reverse logic circuit 108 and the brake contactor is controlled by a motor/brake logic circuit 109.

Figure 10:
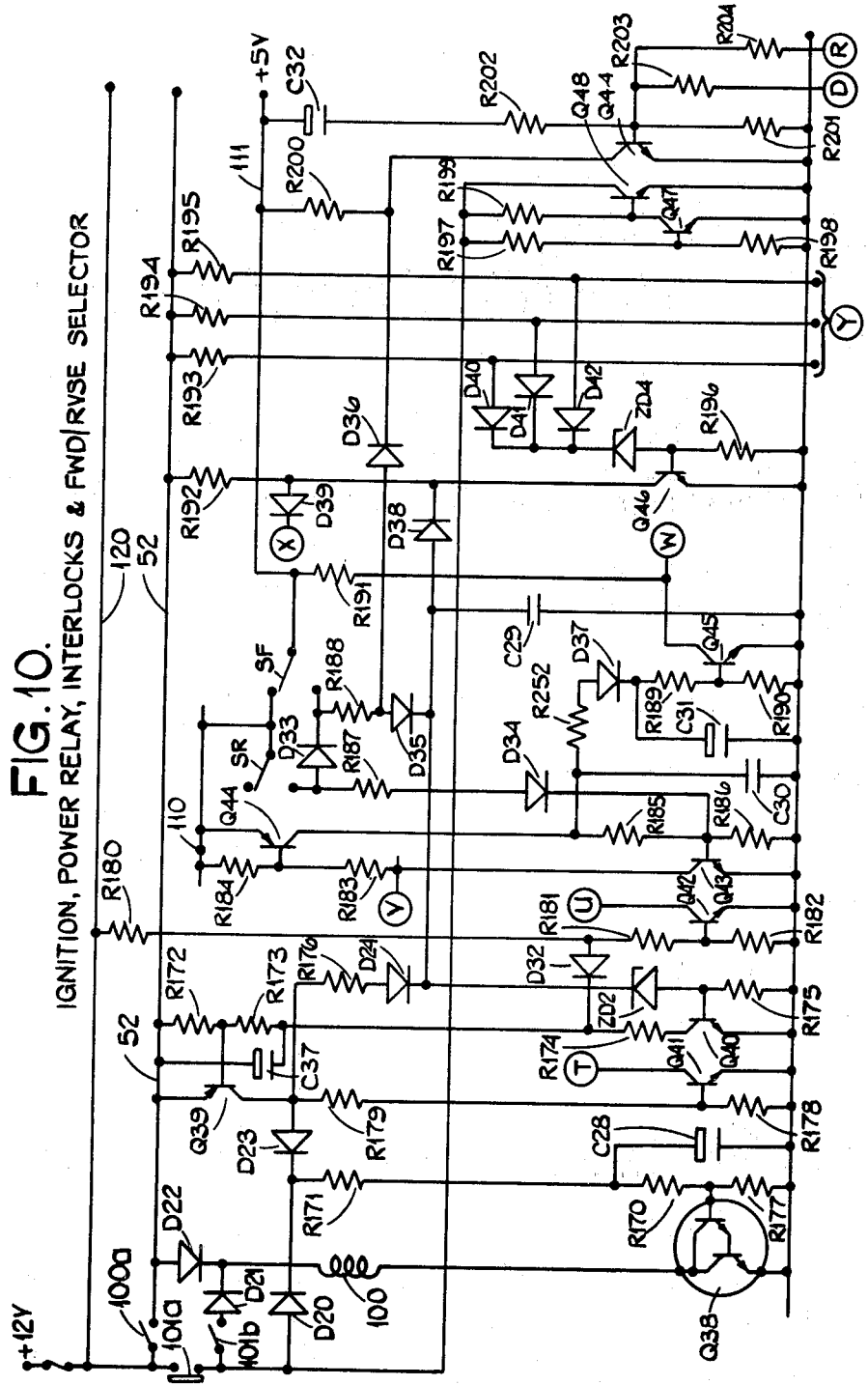
FIGS. 10 and 11 show portions of FIG. 2 in more detail.

Turning now to FIG. 10, the ignition switch has one set of contacts 101a which are closed when the key of the switch is turned to its on position. Turning the key further against a spring load (like a normal vehicle ignition switch) closes a start contact 101b. The contact 101b is connected to the anode of a diode D21 the cathode of which is connected through the relay 100 to the collector of a Darlington pair Q38 with its emitter grounded to the rail 51. The base of the Darlington pair Q38 is connected via two resistors R170 and R171 in series to the cathode of the diode D20. The relay contact 100a connects the 12V input terminal to the rail 52 and a diode D22 has its anode connected to rail 52 and its cathode connected to the cathode of the diode D21. The cathode of a diode D20 (which has its anode connected to the contact 101a) is connected to the cathode of diode D23 with its anode connected to the collector of a p-n-p transistor Q39 having its emitter connected to the rail 52. The base of the transistor Q39 is connected to the rail 52 by a resistor R172 and also by a resistor R173 and a resistor R174 in series to the collector of an n-p-n transistor Q40. The junction of resistors R173, R174 is connected by a capacitor C37 to the rail 52. The emitter of the transistor Q40 is connected to the rail 51 and its base is connected by a resistor R175 to the rail 51 and also to the anode of a zener diode ZD2. The cathode of the zener diode ZD2 is connected to the cathode of a diode D24 the anode of which is connected by a resistor R176 to the anode of the diode D23. The base of the Darlington pair Q38 is connected to the rail 51 by a resistor R177 and the junction of the resistors R170 and R171 is connected to the same rail by a capacitor C28.

A diode D32 has its cathode connected to the junction of the resistors R174 and R173. Its anode is connected to the junction of two resistors R180, R181 which are connected in series with a further resistor R182 between the rails 52 and 51. The junction of the resistors R181 and R182 is connected to the base of an npn transistor Q42 which has its emitter grounded to the rail 51 and its collector connected to a terminal U, (see FIG. 11). An npn transistor Q43 has its emitter connected to the rail 51 and its collector connected by two resistors R183, R184 in series to a sub-rail 110 and a terminal V is also connected to the collector of the transistor Q43. The base of the transistor Q43 is connected to the common point of two resistors R185, R186 connected in series between the collector of a pnp transistor Q44 and the rail 51. The emitter of the transistor Q44 is connected to the sub-rail 110 and its base is connected to the common point of the resistors R183, R184.

The connection of the sub-rail 110 to a +5 V supply rail 111 is controlled by a pair of push button switches SF and SR which are intended to be pressed by the driver of the vehicle to select forward or reverse drive conditions. Both switches are of the single pole two-way type and the common contact of the switch SF is connected to the rail 111. The normally closed contact of the switch SF is connected to the sub-rail 110 and to the common contact of the switch SR. The normally open contact of the switch SF is connected to the cathode of a diode D33, the anode of which is connected to the normally open contact of the switch SR. A resistor R187 connects the normally open contact of the switch SR to the anode of a diode D34 which has its cathode connected to the base of the transistor Q43. The normally open contact of the switch SF is also connected by a resistor R188 to the anode of two diodes D35 and D36. Diode D35 has its cathode connected to the cathode of the zener diode ZD2 and also, by a capacitor C29, to the rail 51.

The collector of the transistor Q44 is connected to the anode of a diode D37 via a resistor R252 and also by a capacitor C30 to the rail 51. The cathode of the diode D37 is connected by two resistors R189 and R190 in series to the rail 51, the resistors R189, R190 being bridged by a capacitor C31. The emitter of the transistor Q45 is connected to the rail 51 and its collector is connected to a terminal W (see also FIG. 11) and also via a resistor R191 to the rail 111.

The cathode of the diode D35 is connected to the anode of a diode D38 the cathode of which is connected by a resistor R192 and by a diode D39 to a terminal X. A group of further terminals Y are each connected by an associated resistor R193, R194 and R195 to the rail 52 and also by associated diodes D40, D41, D42 to the cathode of a zener diode ZD4, the anode of which is connected to the base of an npn transistor Q46 and by a resistor R196 to the rail 51. The terminals X, and Y are all associated with various interlock switches. For example the terminal X is grounded if a battery charger is plugged into a charging socket on the vehicle. The terminals Y are grounded when connections to the speed and current transducer are properly made.

The anode of the diode D20 is also connected by two resistors R197 and R198 to the rail 51 with the common point of these resistors connected to the base of an npn transistor Q47. The emitter of the transistor Q47 is connected to the rail 51 and its collector is connected to the base of an npn transistor Q48 and also by a resistor R199 to the cathode of the diode D38. The emitter of the transistor Q48 is connected to the rail 51 and its collector is connected to the cathode of the diode D38.

A further npn transistor Q49 has its emitter connected to the rail 51 and its collector connected by a resistor R200 to the rail 111, and also connected to the cathode of the diode D36. The base of the transistor Q44 is connected by a resistor R201 to the rail 51 and by a resistor R202 and a capacitor C32 in series to the rail 111. A resistor R203 connects the base of the transistor Q49 to the terminal D (See FIG. 3) and a resistor R204 connects the base of the transistor Q49 to the terminal R (see FIG. 8).

Figure 11:
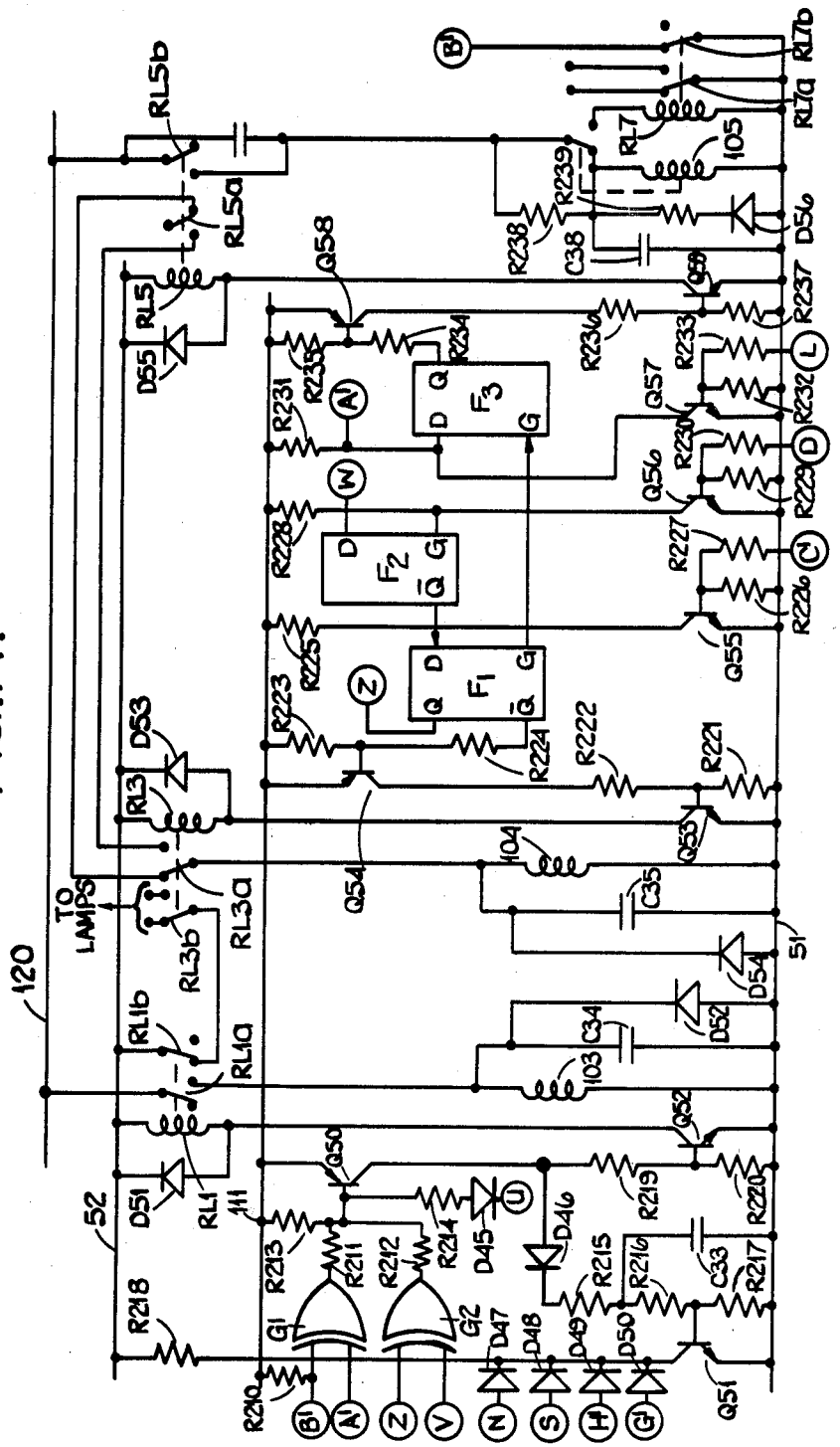

Turning now to FIG. 11, there are shown two exclusive OR gates G1 and G2, of which the gate G1 has its input terminal connected to terminals A' and B' (to be referred to again hereinafter). The input terminal connected to the terminal B' is also connected to the rail 111 by a resistor R210. The gate G2 has its input terminals connected to terminals Z and V respectively (see FIG. 10 for terminal V.) The output terminals of the two gates G1 and G2 are connected by two resistors R211 and R212 to the base of a pnp transistor Q50, which base is also connected by a resistor R213 to the rail 111 to which the emitter of the transistor Q50 is also connected so that the transistor Q50 is biased off by the resistor R213. The base of the transistor Q50 is also connected by a resistor R214 and a diode D45 to the terminal U so that the transistor Q50 can be turned on by turning on of the transistor Q42 (FIG. 10).

The collector of the transistor Q50 is connected to the anode of a diode D46 the cathode of which is connected by three resistors R215, R216 and R217 in series to the rail 51. A capacitor C33 bridges the two resistors R216 and R217 and an npn transistor Q51 has its base connected to the junction of the resistors R216 and R217. The emitter of the transistor Q51 is grounded to the rail 51 and its collector is connected to the rail 52 by a resistor R218. Diodes D47, D48, D49 and D50 connect the collector of the transistor Q51 to the terminals N (FIG. 6), S (FIG. 8) and G' and H' (FIG. 5) respectively, so that the voltage at these terminals is held low whenever the transistor Q51 is conductive.

The collector of the transistor Q50 is also connected by two resistors R219, R220 in series to the rail 51 with the common point of these resistors connected to the base of an npn transistor Q52 which has its emitter connected to the rail 51. The collector of the transistor Q52 is connected by a relay winding RL1 to the rail 52, with a current recirculating diode D51 connected across the winding of the relay RL1. The relay RL1 has a normally open contact RL1a connected in series with the relay winding 103 between the rail 51 and a +12 V supply rail 120 not controlled by the contacts 100a a capacitor C34 and a current recirculating diode D52 in parallel being connected in parallel across the winding 103 which controls the contact S2 (FIG. 9). The relay RL1 also has a normally closed contact RL1b connected at one side to the rail 52.

A further relay winding RL3 is connected between the collector of an npn transistor Q53 and the rail 52, the emitter of the transistor Q53 being connected to the rail 51. The relay RL3 has a first change over contact RL3a the common terminal of which is connected by the relay winding 104 to the rail 51, with a current recirculating diode D54 and a capacitor C35 in parallel across the winding 104. The winding 104 controls the contacts 1A, 1B of FIG. 9. The relay RL3 has a second change over contact RL3b which connects the normally closed contact RL1b to one of two indicator lamps associated with the forward/reverse selector switches SF, SR of FIG. 10 to indicate when a selected drive direction instruction has been carried out.

The base of the transistor Q53 is connected to the common point of two resistors R221 and R222 connected in series between the rail 51 and the collector of a pnp transistor Q54 which has its emitter connected to the rail 111. The base of the transistor Q54 is connected to the common point of two resistors R223 and R224 connected in series between the rail 111 and the $\overline{Q}$ output terminal of a latch circuit F1 (constituted by ¼ of a Texas Instruments Ser. No. 7475 integrated circuit). The Q output terminal of the circuit F1 is connected to the terminal Z associated with the gate G2. The G input terminal of the circuit F1 is connected to the collector of an npn transistor Q55 and by a resistor R225 to the rail 111. The emitter of the transistor Q55 is connected to the rail 51 and its base is connected by a resistor R226 to the rail 51 and by a resistor R227 to a terminal C' at which there is a positive going signal to turn on the transistor Q55 whenever the armature current is other than zero, such signal being derived from a current detector circuit (not shown), connected to the terminal I of FIG. 6.

A further Ser. No. 7475 latch circuit F2 has its $\overline{Q}$ output terminal connected to the D input terminal of the circuit F1. The D input terminal of the circuit F2 is connected to the terminal W (FIG. 10) and its G input terminal is connected to the rail 111 by a resistor R228 and to the collector of an npn transistor Q56 which has its emitter connected to the rail 51. The base of the transistor Q56 is connected by a resistor R229 to the rail 51 and by a resistor R230 to the terminal D (FIG. 3) so that the transistor Q56 is turned on when the speed signal at the terminal D is greater than a predetermined minimum value.

Yet a further Ser. No. 7475 latch circuit F3 has its G input terminal connected to the collector of the transistor Q55 and its D input terminal connected to the collector of an npn transistor Q57 which has its emitter grounded to the rail 51. The terminal A' associated with the gate G1 is also connected to the collector of the transistor Q57 which is connected to the rail 111 by a resistor R231. The base of the transistor Q57 is connected by a resistor R232 to the rail 51 and by a resistor R233 to the terminal L (FIG. 5). The Q output terminal of the circuit F3 is connected by two resistors R234, R235 in series to the rail 111 with the common point of these resistors connected to the base of a pnp transistor Q58 with its emitter connected to the rail 111. The collector of the transistor Q58 is connected by two resistors R236, R237 in series to the rail 51, with the common point of these resistors connected to the base of an npn transistor Q59 with its emitter grounded to the rail 51. The collector of the transistor Q59 is connected by a relay winding RL5 to the rail 52 with a current recirculating diode D55 across the winding RL5. The relay RL5 has a change-over contact RL5a with its common terminal connected to the rail 52, and its normally open and closed terminals connected respectively to the normally open and closed terminals of the relay contact RL3a. The relay RL5 also has a normally open contact RL5b connected between the rail 120 and the motor/brake contactor 105 (which controls the contact 56 of FIG. 7), via a normally closed contact 105a of the contact 105. The contact 105a is bridged by a resistor R238, and a resistor R239 and current recirculating diode D56 are connected in series across the winding 105. A capacitor C36 also bridges the contactor winding 105. A further relay winding RL7 is connected to a normally open terminal of the contact 105a and controls a change over contact RL7a (see also FIG. 5) and a normally closed contact RL7b connecting the terminal B' associated with the gate G1 to the rail 51.

When the "ignition" switch is moved to its normal on position the Darlington transistor Q38 receives base current via the diode D20 and the resistors R170 and R177. In addition the transistor Q47 is turned on via the resistor R197. Moving the "ignition" switch to the start position enables the relay 100 to pull in through the diode D21 and this causes power to be supplied to the rest of the circuit and also causes relay 100 to latch via the diode D22.

When one of the switches SF or SR is pressed, the transistor Q40 turns on via the resistor R188 and the diodes D35 and ZD2. This turns on the transistor Q39 via the resistors R173 and R174 and the capacitor C37 across the resistors R172 and R173 charges. The transistor Q39 and Q40 forms a latch arrangement such that when the transistor Q39 turns on the transistor Q40 is held on via the resistor R176 and the diode D24. This also turns on the transistor Q41 via the resistor R179 so as to supply power to a relay controlling a main isolator for the armature chopper circuit which now becomes live.

This start up sequence only occurs if certain conditions are satisfied and various safety interlocks are provided. The transistor Q46 must be off so that the terminals Y must all be grounded. If this is not so the cathode of the diode D36 is held low through transistor Q46 and the transistor Q40 is unable to turn on when one of the switches SF, SR is actuated. There is also a further interlock comprising the transistor Q44 and the diode D36. As switch on the upper side of capacitor C32 goes to 5 V and the transistor Q44 therefore turns on for a short time holding the anode of the diode D36 low so that pressing of either switch SF or SR again has no effect until the transistor Q44 turns off. This delay of approximately 250 mS is intended to prevent the main isolators closing until after the other sections of the circuit have settled in their correct operating states. The transistor Q44 can also be turned on by signals from the terminals D and R to prevent the isolators closing if the vehicle is moving when switched on or if a demand on the accelerator is present.

At this stage the shut down sequence can also be understood. When the ignition switch is opened, the transistor Q47 turns off and the transistor Q48 turns on removing base drive from the transistor Q40 which turns off. The capacitor C37 then discharges through the resistor R173 and after a 200 mS delay the transistor Q39 turns off. This maker the transistor Q41 turn off, causing the main isolators to open. After another short delay, during which the capacitor C28 is discharging, the transistor Q38 turns off removing the power supply from all the circuits.

It is to be noted that if one of the interlock terminals Y is removed from ground whilst the system is in use or if the cathode of the diode D39 is grounded (which occurs when the charger plug is inserted) the main isolators open but the power to the various other circuits is not interrupted.

When one of the selector switches SR, SF is actuated the latch constituted by the transistors Q43 and Q44 assume its appropriate state, ie off for forward and on for reverse. If the on state is selected the transistor Q45 is held on by base current via diode D37 and resistor R189 so that the collector of the transistor Q45 is low. If on the other hand forward is selected the collector is the transistor Q45 is pulled high by the resistor R191. The capacitor C31 produces a delay between the latch changing state and the collector voltage of the transistor Q45 responding, this being used to generate a field forcing signal as follows: The output of the gate G2 is high if either one of its inputs is low, but low if both are high or both are low. When the push button latch (Q43, Q44) changes from forward to reverse, the transistor Q43 turns on and hence the terminal V to the gate G2 goes low. The other input of the gate G2 is connected to the Q output terminal of the latch circuit F1. The signal from the collector of the transistor Q45 (terminal W) goes to the D input of the latch circuit F2 so that if there is an input at terminal D sufficient to turn on the transistor Q56 the transition in the signal at terminal W has no effect since the G terminal of the latch F2 is held low. If reverse is selected the D input of latch F2 goes low but the latch cannot change until the speed signal at terminal D goes low. However the signal at terminal V goes low when the push button latch changes and the signals at terminal Z stays low since the latches F1 and F2 have not yet changed. This is an "out of phase" condition—i.e. reverse is demanded, but forward remains selected. The gate G2 detects this and its output goes low, turning on the transistor Q50. This causes the armature and field current demand signals to be clamped to 0V via the diodes D48, D49 and D50 and the transistor Q51. This ensures that the armature and field choppers are both turned off. The transistor Q52 is also turned on, energising the relay RL1 and also the relay 103. This breaks the field current and gives a quick decay to zero field current. When the current has decayed the signal at the terminal C' goes low and the transistor Q55 turns off so that the G input to the latch F1 goes high and, provided that the latch F2 has already changed, the Q output of latch F1 goes high and its Q̄ output goes low, turning on the transistors Q53 and Q5 to energise the relays RL3 and 104. Since the terminal Z is now high the output of the gate G2 also goes high and the field forcing relay drive and clamping signal is removed. The field forcing relay 103 goes back to its normal stae and after a delay of 150 mS, while the capacitor C33 discharges, the transistor Q51 turns off and releases the demand clamps. This delay ensures that the various relays have had time to settle in their new positions.

The delay between change of state of the latch Q43 and Q44 and the corresponding change in the signal at the terminal W, has a further effect, namely that the output of the gate G2 goes low every time a change in direction is demanded. This is desirable because, if the vehicle is stationary and a small field current is flowing such that the current detector does not detect if (a finite current being required for this purpose), the latches F1 and F2 can change immediately and the reverse relay is called upon to break a finite current. With the delay mentioned included, a forcing period automatically occurs before the latch F2 D input changes ensuring that the field and armature currents are actually zero.

Field forcing also occurs at switch on and switch off. When the relay 100 pulls in the 12 V supply turns on the transistor Q42 through the resistors R180 and R181 which holds on the transistor Q50 through the diode D45 and the resistor R214. When one of the switch SF, SR is actuated, the transistor Q40 turns on and the transistor Q42 turns off so that the transistor Q50 turns off and the forcing is released. On switch off, the transistor Q40 turns off and the transistor Q42 turns on during the various shut down delays, ensuring that no demand signals occur during this period.

The state of the motor/brake circuit is determined by the Q output of the latch F3. The demanded input is applied to the D input of this latch via the transistor Q57 according to the signal at the terminal L. When motoring is required this is high and the D input to latch F3 is thus low. This changes when braking is required and the latch F3 changes when the I signal at terminal C' goes low. In addition gate G1 detects the out of phase condition between the D input of latch F3 and the signal from the relay RL7b, which is low in motoring and high in braking. Because of the inherent delay in the contactor and drive relay, this out of phase condition always occurs and when it does the forcing sequence described above takes place and is not released until the contactor has settled in its new position.

The relay RL5 also controls the field reversing relay 104 to reverse the field when changing from motoring to braking and also ensures correct operation in forward and reverse, reverse motoring requiring the same field current sense as forward braking. The forcing sequence occurs if there is a current flowing at C' is high, because this holds the G input terminal of the latch F3 low until the current falls owing to the operation of the field forcing arrangement. The latch F3 can then change followed by the contactor and then the relay RL7 operates to remove the out of phase condition. This arrangement of interlocks ensures that the contactor breaks no current at any time and is never required to make into a current.

I claim:

1. A control circuit for an electric vehicle traction motor comprising an armature current control for switching an armature current control element on and off respectively when the armature current exceeds and is less than an armature current demand by a predetermined amount, a field current control mode selection means for connecting the armature and field windings to provide motoring or regenerative braking, means operable during motoring to weaken the field current whenever the armature current fails to exceed the armature current demand by said predetermined amount and means operating during regenerative braking for weakening the field current whenever the armature current exceeds a predetermined level.

2. A control circuit as claimed in claim 1 in which said armature current control includes a first difference amplifier connected to compare an armature current demand signal with a signal generated by an armature current transducer, and switching means connecting said first difference amplifier to the armature current control element.

3. A control circuit as claimed in claim 2 in which said means operable in motoring comprises a second difference amplifier, means connecting the output of the first differnce amplifier to an input of said second difference amplifier, said second difference amplifier comparing the output of the first difference amplifier with a reference valve, and means operable by the output of the second difference amplifier controlling the field current.

4. A control circuit as claimed in claim 3 in which said means operable in braking comprises a further difference amplifier connected in inverting mode and comparing the output of the first difference amplifier with a different reference level, and diode means connecting the output of the further difference amplifier to the input of the second difference amplifier, whereby said second difference amplifier receives the larger of the two signals comprising the output of the first difference amplifier and the output of the further difference amplifier.

5. A control circuit as claimed in claim 3 in which said means connecting the output of the first difference amplifier to the input of the second difference amplifier includes start-up switch means normally acting to prevent the output of the first difference amplifier being applied to the input of the second difference amplifier and means operable to operate said switch means to apply the output of the first difference amplifier to the input of the second difference amplifier when the armature current has failed to exceed the current demanded by said predetermined amount for a time in excess of a predetermined duration.

* * * * *